Oct. 18, 1960 — E. R. BAUSH — 2,956,886
PROCESS FOR FREEZING MEAT
Filed May 7, 1959

INVENTOR
EDWARD R. BAUSH

BY Cushman, Darby & Cushman
ATTORNEYS

United States Patent Office 2,956,886
Patented Oct. 18, 1960

2,956,886

PROCESS FOR FREEZING MEAT

Edward R. Baush, Bedford, Mass., assignor to W. R. Grace & Co., Cambridge, Mass., a corporation of Connecticut Filed May 7, 1959, Ser. No. 811,576

1 Claim. (Cl. 99—194)

This invention relates to a process for freezing meat.

The conventional procedure for packaging meat in an envelope of a shrinking film is to package the meat, shrink the film, and then freeze the package meat. Such a procedure does not preserve the desired red color of the meat upon prolonged frozen storage.

It has also been proposed to freeze meat rapidly to provide a hard crust on the meat but leaving the interior of the meat only lightly frozen to obtain a surface oxidation, place the meat in an envelope of a shrinkable material, evacuate the envelope to remove the air and prevent further oxidation, heat shrink the envelope around the meat, and to thaw the surface of the meat slightly to melt the surface crystals and bring out the original meat color, and then rapidly freeze the sealed package in the absence of oxidizing conditions to preserve the meat. This process has the disadvantage that the already frozen meat must be thereafter packaged. Furthermore, two separate freezing stages are required. Additionally, this procedure requires a deliberate oxidation during the freezing of the meat.

It is an object of the present invention to overcome the disadvantages of such prior procedures and to provide an improved method of freezing and packaging meat.

Another object is to provide a good red color to frozen red meat.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
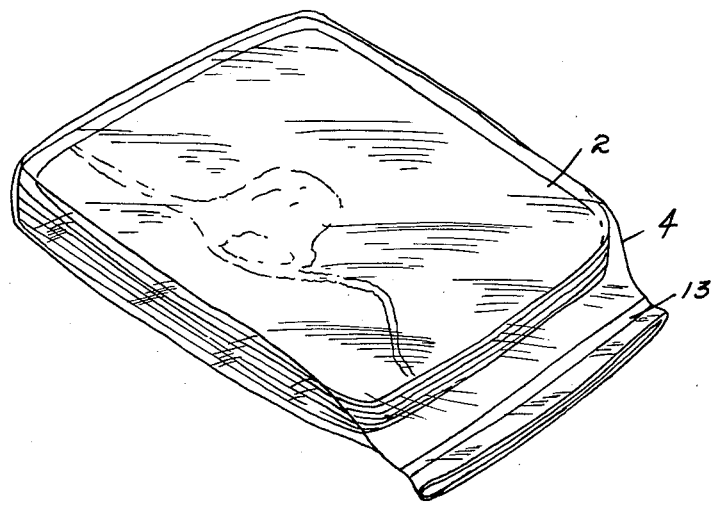
Figure 1 is a perspective view of the packaged meat.
Figure 2:
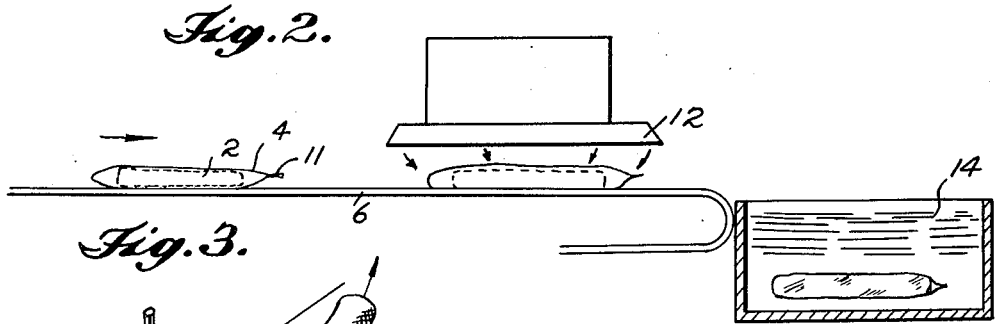
Figure 2 is a diagrammatic illustration of the process.
Figure 3:
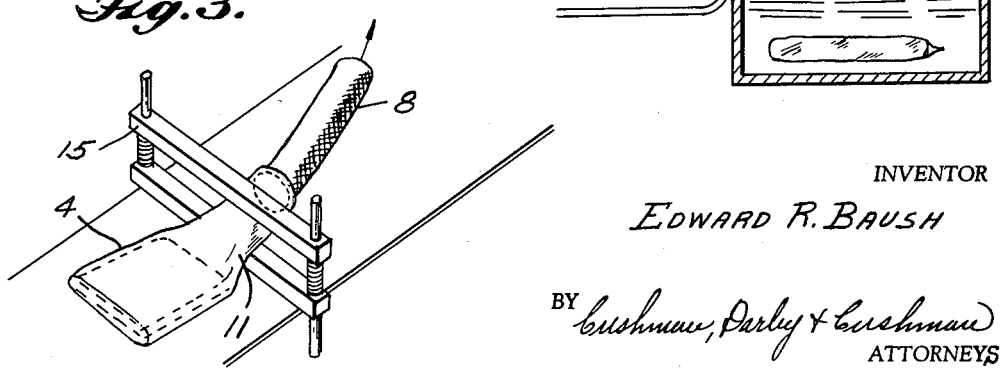
Figure 3 is a view illustrating one method of sealing the package.

Briefly, the process of the present invention comprises (1) packaging red meat such as beef, pork, lamb or veal in an envelope of a heat shrinkable biaxially oriented film which is impervious to air, e.g., heat shrinkable rubber hydrochloride or vinylidene chloride resin (Saran) or vinylidene chloride resin coated polyethylene (including vinylidene chloride resin coated irradiated polyethylene wherein the irradiation is to an extent of 2 to 100 megarad), (2) freezing the packaged meat, e.g., at +5 to —40° F., by either blast, plate freezing or immersion freezing, and (3) heat shrinking (e.g., at 200 to 212° F.) the biaxially oriented film around the meat to form the finished package. The air can be evacuated from the package immediately prior to the heat shrinking, or a non-vacuum package can be prepared, provided tight package seals are made.

A piece of red meat, e.g. beef, 2 is placed in a bag 4 made of a heat shrinkable vinylidene chloride resin. The bag is advanced from stage to stage in the process on endless conveyor belt 6. Air is evacuated from the bag by affixing the open end to a nozzle 8 connected to a suction pump (not shown). After evacuation of the air, the bag collapses and the film clings to the surface of the meat. The open end 11 of the bag is then sealed by any convenient means such as heat sealer 15 to produce a sealed area 13. Once the red meat is vacuum packaged, it must be frozen quickly, e.g. 15–30 minutes, to prevent the red meat pigment oxymyoglobin (red color) from turning to the reduced state or myoglobin (purple color) because of the lack of oxygen within the vacuum package. The packaged meat then passes under freezer 12 where it is quickly frozen by a blast of cold air to a temperature of —30° F. (Alternatively, the packaged meat could be frozen by immersion in an aqueous calcium chloride or sodium chloride solution or by immersion in propylene glycol.) It is important that the meat be either completely or well crusted to resist melting during the shrinking operation. The rapid or almost instantaneous freezing sets the red color. However, a whitish color appears on the meat due to the ice crystals that are formed. To bring back the bright red color, the frozen meat in the bag 4 is then passed briefly, e.g., 1 or 2 seconds, through shrink tank 14 containing water at 206° F. The heat of the shrink tank shrinks the bag tightly around the meat, gives a better looking product, and simultaneously melts the surface area of the meat which then refreezes almost immediately because of the residual cold of the product. The refreezing rate, however, is slow enough to change the ice crystal size or structure so that the bright red meat color is not obscured by the ice crystals. The product is then stored utilizing standard frozen meat storage procedures, e.g., at +5 to —10° F.

Shrinking by use of hot water after freezing by immersion of the bag and meat in immersion solutions as propylene glycol or calcium chloride or sodium chloride, for example, helps wash off residual solution from the package.

In place of vacuum packaging, there can also be prepared non-vacuum packages if tight package seals are made.

What is claimed is:

The method of preventing color loss of red meat consisting essentially of placing red meat having a bright red color in an envelope of a heat shrinkable plastic, promptly thereafter freezing the meat in the bag whereby a whitish color of ice crystals appears on the surface of the meat, and then heating the bag for up to 2 seconds to shrink the film around the meat and permit the ice crystals to melt, removing the heat and permitting the ice crystal structure to reform on the surface of the meat because of the residual cold of the product itself to convert the whitish color of the frozen product back to the bright red color.

References Cited in the file of this patent

UNITED STATES PATENTS

| | | |
|---|---|---|
| 2,376,583 | De Poix | May 22, 1945 |
| 2,825,652 | Berkowitz | Mar. 4, 1958 |
| 2,865,765 | Allen | Dec. 23, 1958 |
| 2,865,767 | Gore | Dec. 23, 1958 |